United States Patent
Ozog et al.

(10) Patent No.: US 11,168,990 B2
(45) Date of Patent: Nov. 9, 2021

(54) CROWDSOURCING ANNOTATIONS OF ROADWAY INFORMATION

(71) Applicant: Toyota Research Institute, Inc., Los Altos, CA (US)

(72) Inventors: Paul J. Ozog, Los Altos, CA (US); Ryan W. Wolcott, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 305 days.

(21) Appl. No.: 16/298,347

(22) Filed: Mar. 11, 2019

(65) Prior Publication Data

US 2020/0292322 A1    Sep. 17, 2020

(51) Int. Cl.
*G01C 21/32* (2006.01)
*G06F 16/23* (2019.01)
*G06F 16/29* (2019.01)
*G06K 9/00* (2006.01)

(52) U.S. Cl.
CPC .......... *G01C 21/32* (2013.01); *G06F 16/235* (2019.01); *G06F 16/29* (2019.01); *G06K 9/00798* (2013.01); *G06K 9/00818* (2013.01)

(58) Field of Classification Search
CPC ....... G01C 21/32; G06F 16/29; G06F 16/235; G06F 16/9537; G06K 9/00818; G06K 9/00798; G06K 9/00791
See application file for complete search history.

(56) References Cited

U.S. PATENT DOCUMENTS

| | | | |
|---|---|---|---|
| 6,351,698 B1 | 2/2002 | Kubota et al. | |
| 6,873,908 B2 | 3/2005 | Petzold et al. | |
| 8,600,956 B2 | 12/2013 | Kuo et al. | |
| 8,718,910 B2 | 5/2014 | Gueziec | |
| 8,948,501 B1* | 2/2015 | Kim | G06K 9/00711 382/159 |
| 9,760,090 B2* | 9/2017 | Shashua | B62D 15/025 |
| 9,939,813 B2* | 4/2018 | Shashua | G06K 9/3258 |
| 10,489,663 B2* | 11/2019 | Olson | G06K 9/3233 |
| 2011/0313779 A1 | 12/2011 | Herzog et al. | |
| 2015/0253141 A1* | 9/2015 | Kesting | G06K 9/00637 701/409 |
| 2015/0266455 A1* | 9/2015 | Wilson | B60W 30/10 701/93 |
| 2016/0360336 A1* | 12/2016 | Gross | H04M 1/72403 |
| 2016/0360382 A1* | 12/2016 | Gross | G06F 3/04186 |

(Continued)

FOREIGN PATENT DOCUMENTS

| | | |
|---|---|---|
| JP | 2008-152385 A | 7/2008 |
| WO | WO 2014/130591 A1 | 8/2014 |
| WO | WO 2015/157344 A2 | 10/2015 |

*Primary Examiner* — Mussa A Shaawat
(74) *Attorney, Agent, or Firm* — Oblon, McClelland, Maier & Neustadt, L.L.P.

(57) ABSTRACT

A map object management system including object information for objects in the environment around a location. The objects generally relating to the roadway on which a user is travelling. The map object management system provides a user with queries regarding detected objects that fail to meet confidence thresholds regarding the identification of the object. The map object management system receives answers to the queries to crowdsource uncertain or inaccurate object identifications for use in a map service to provide accurate map information to users.

20 Claims, 6 Drawing Sheets

(56) References Cited

U.S. PATENT DOCUMENTS

| | | | |
|---|---|---|---|
| 2016/0378868 A1* | 12/2016 | Har-Noy | G06Q 30/018 |
| | | | 707/706 |
| 2017/0031925 A1* | 2/2017 | Mishra | G06F 16/23 |
| 2017/0124476 A1* | 5/2017 | Levinson | G01S 17/931 |
| 2017/0248960 A1* | 8/2017 | Shashua | G01C 21/3819 |
| 2017/0277716 A1 | 9/2017 | Giurgiu et al. | |
| 2017/0353423 A1* | 12/2017 | Morrison | G06F 16/951 |
| 2018/0188045 A1* | 7/2018 | Wheeler | G06K 9/00791 |
| 2019/0384294 A1* | 12/2019 | Shashua | G05D 1/0088 |

* cited by examiner

CROWDSOURCING ANNOTATIONS OF ROADWAY INFORMATION

BACKGROUND

Technical Field

The present invention relates to map information management system managing environmental information for locations on a map.

Background Art

With the spread of satellite position technology, new industries such as autonomous vehicles and navigation systems are considered. In any of these new systems, a detailed map with up-to-date and detailed roadway information (a dynamic map) is necessary for better travel. This detailed roadway information (e.g., structural and abstract roadway information) establishes a clearer understanding of the roadway environment in which a user and/or vehicle is travelling.

Autonomous and semi-autonomous vehicles are mounted with a large number of autonomous sensors such as cameras, radars/lidars, global positioning systems, etc. to observe the surrounding environment of a vehicle and determine information necessary for travel associated with the environment. Such travel information may include obstacles and roadway information.

Additionally, autonomous vehicle and users are able to receive detailed map information from various mapping systems. Although receipt of map information is common, the additions and updates to map information often occur long after a user has been travelling and/or is limited.

SUMMARY

When a map is generated, map information that was used to populate the map may be incomplete, inaccurate, or contain discrepancies. Generation of map information may be by a map service provider through more direct means (e.g., camera cars or through manual data entry). However, this map information may be out of date or not detailed enough.

Thus, the user and autonomous vehicle may help other users of the map service provider as well as themselves by providing up-to-date and more detailed information to the map service provider. However, it is often difficult for users to know what map information may be sent and what details need to be added without being prompted for that map information. Conventional map information management systems do not employ any schemes to query for map information and instead rely on the other means described above or through post-travel editing of maps. Post-travel editing by users is difficult for many reasons including user recall of objects on the map well after they have travelled on/near those objects.

The present disclosure is provided for solving, among other things, the above-mentioned problem of how best to update and clarify map information for locations on a map. The present disclosure describes a map information management system which queries users to verify structural and/or abstract aspects of the environment of a roadway to improve the map information.

According to the present disclosure, it is possible to create a map information system which is able to update map information in real time for more accurate map information.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
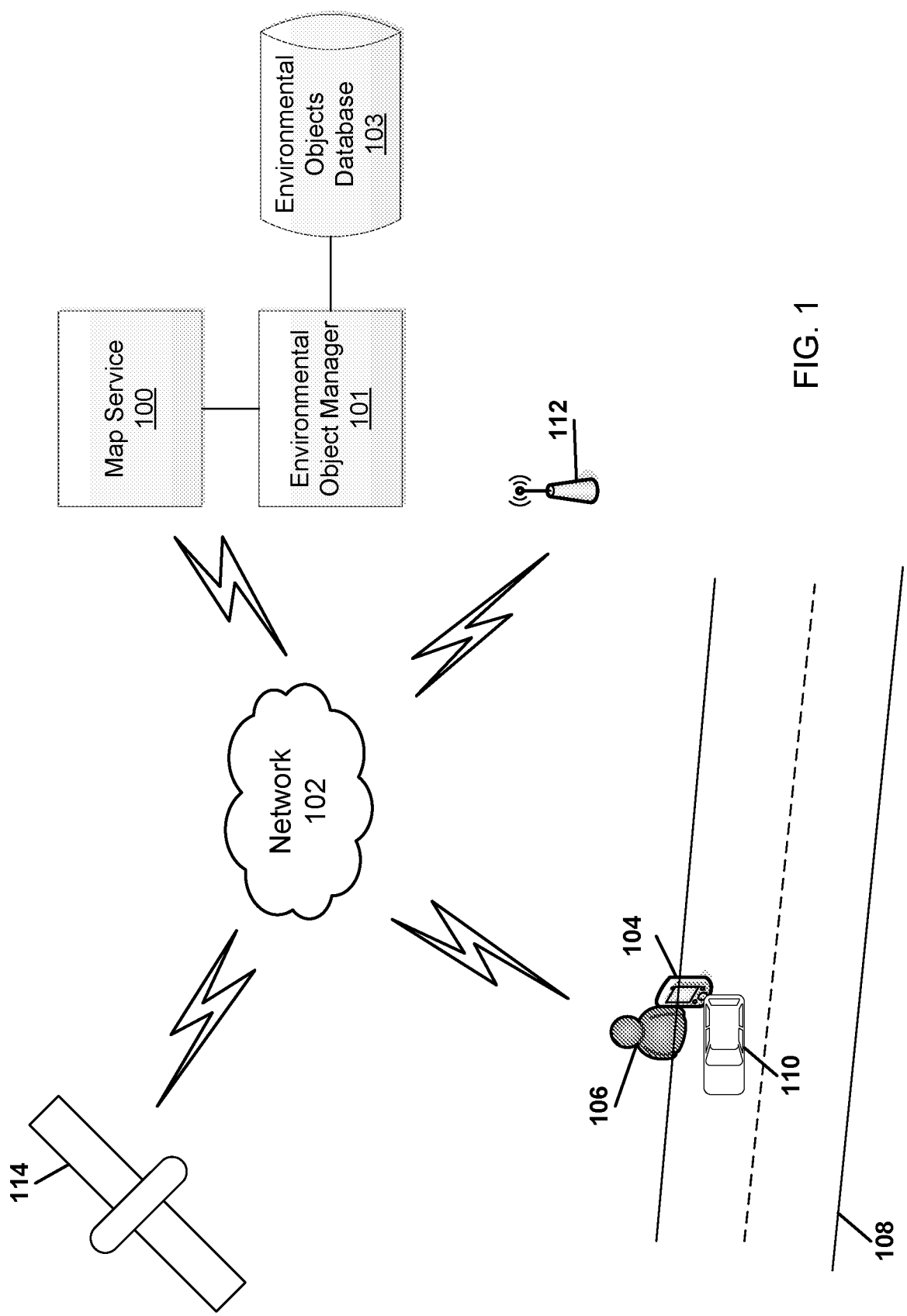
FIG. 1 shows a schematic diagram of a map information management system according to one exemplary embodiment.

FIG. 1 shows a schematic diagram of a map information management system according to one exemplary embodiment. In FIG. 1, a server 100, providing a map service, may receive the data inputs from the users via a network 102. The users may transmit information about environmental objects along a path of travel. The server 100 is further described as connected to an environmental object manager 101 which may include a device, application, or circuitry which is capable of accessing an environmental objects database 103. In other embodiments, the map service server 100 may include the environmental object manager 101 as a component or unit of the same server 100 (hereinafter, the server 100 and environmental object manager 101 may be used interchangeably for the same environmental object manager). The environmental objects database 103 may include information about objects along a roadway including surrounding constructions (e.g., nearby buildings, bridges, archways, tunnels, etc.), road geometry, signage, traffic road environmental information such as pavement sign displays, road shapes, road surface conditions, traffic construction points, and the like.

Figure 4:
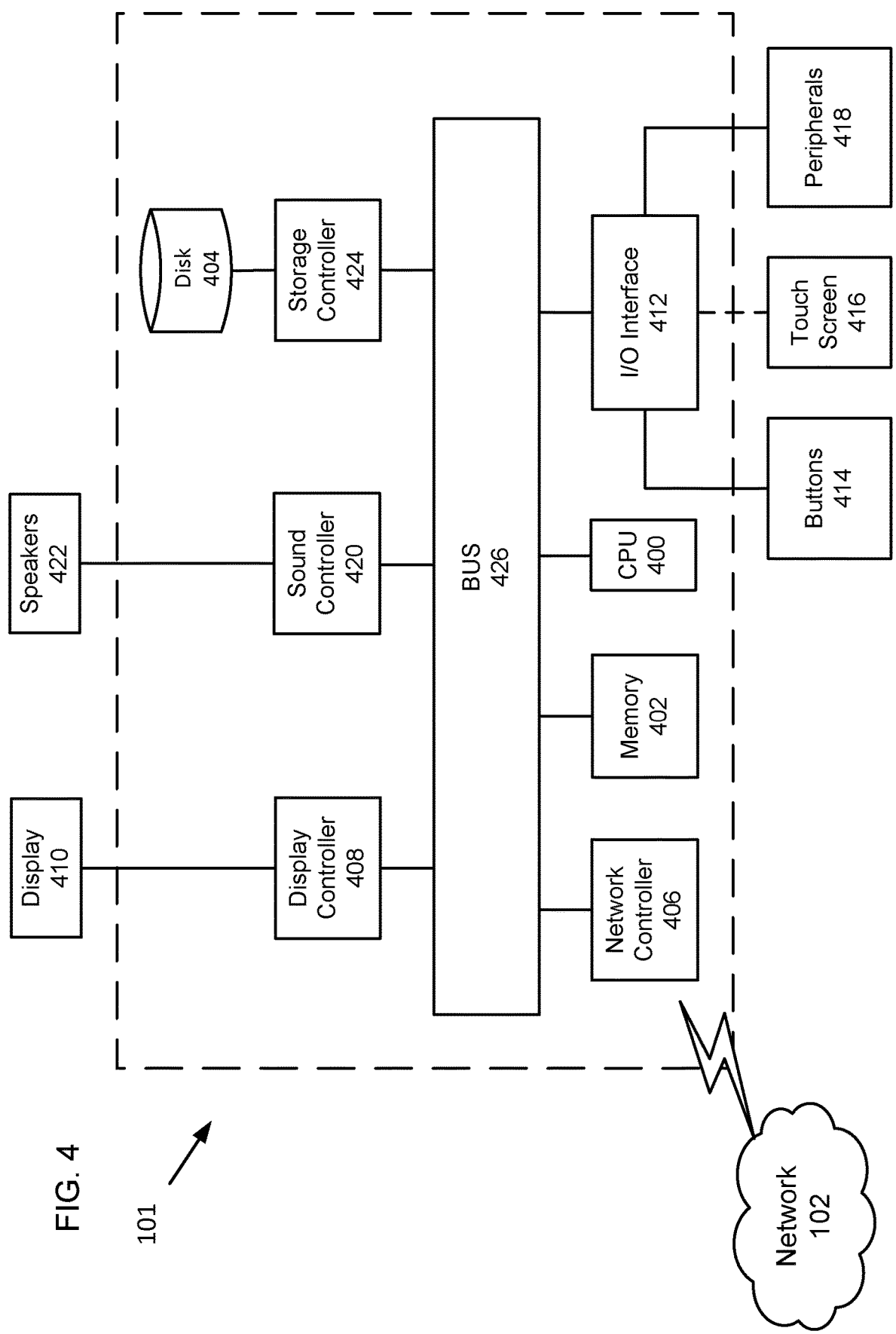
FIG. 4 shows an exemplary block diagram of a server according to one exemplary embodiment.

A mobile device 104 associated with a user 106 may connect to the server 100 via the network 102. The mobile device 104 represents one or more mobile devices connected to the server 100 via the network 102 to upload the data inputs and/or update and present map information to the user 106 of the mobile device 104. The server 100 is one or more servers that provide map and navigation services to users 106 of mobile devices 104. The network 102 is any network that allows the mobile devices and the servers to communicate information with each other over computer network. The server 100 includes a CPU 400 and a memory 402, as shown in FIG. 4.

The network 102 may include the Internet or any other network capable of communicating data between devices. Suitable networks can include or interface with any one or more of a local intranet, a PAN (Personal Area Network), a LAN (Local Area Network), a WAN (Wide Area Network), a MAN (Metropolitan Area Network), a VPN (Virtual Private Network), or a SAN (storage area network). Furthermore, communications may also include links to any of a variety of wireless networks, including WAP (Wireless Application Protocol), GPRS (General Packet Radio Service), GSM (Global system for Mobile Communication), CDMA (Code Division Multiple Access) or TDMA (Time Division Multiple Access), cellular phone networks, GPS (Global Positioning System), CDPD (Cellular digit packet data), Bluetooth radio, or an IEEE 802.11 based radio frequency.

The mobile device 104 includes a mobile telephone, a laptop, a smart phone, a tablet PC, cellphones, wireless phones, pagers, electronic organizers, PDAs, devices integrated into the vehicle 110, or the like.

The mobile device 104 is capable of accessing sensors on vehicle 110 to collect data about the roadway and its surroundings. These sensors may include lidar, radar, intertial measurement units (IMUs), and camera units. In other embodiments, sensors such as camera units from the mobile device 104 may be used to collect data about the roadway and its surroundings.

In one embodiment, the server 100 may use the mobile device's 104 location to determine the vehicle's 110 geographical location. The mobile device's 104 location can be determined via various satellite-based positioning systems known in the art, such as GPS (Global Positioning System). For example, the mobile device 104 may include a location detector. The location detector may be a GPS module for detecting a current geographical location of the mobile device. FIG. 1 shows a satellite 114. In one embodiment, the mobile device's location is determined via a cellular tower 112 with which communication has been established using current technology such as GMS (Global System for Mobile) localization, triangulation, Bluetooth, hotspots, WiFi detection, or other methods as would be understood by one of ordinary skill in the art. In one embodiment, the mobile device's location is determined by the network 102. In particular, the CPU 400 may detect a location of the mobile device 104 as a network address on the network 102. The CPU 400 may also store the location of the mobile device 104 in the memory 402.

FIG. 1 also depicts a road 108 that is part of the network of roads in a geographic area. The vehicle 110 is shown as traveling on the road 108. The vehicle 110 may be a car, a motorcycle, a boat, a bicycle, an autonomous or semi-autonomous vehicle or any other structure used for transportation that may include sensors for viewing the environment surrounding the vehicle.

Figure 2:
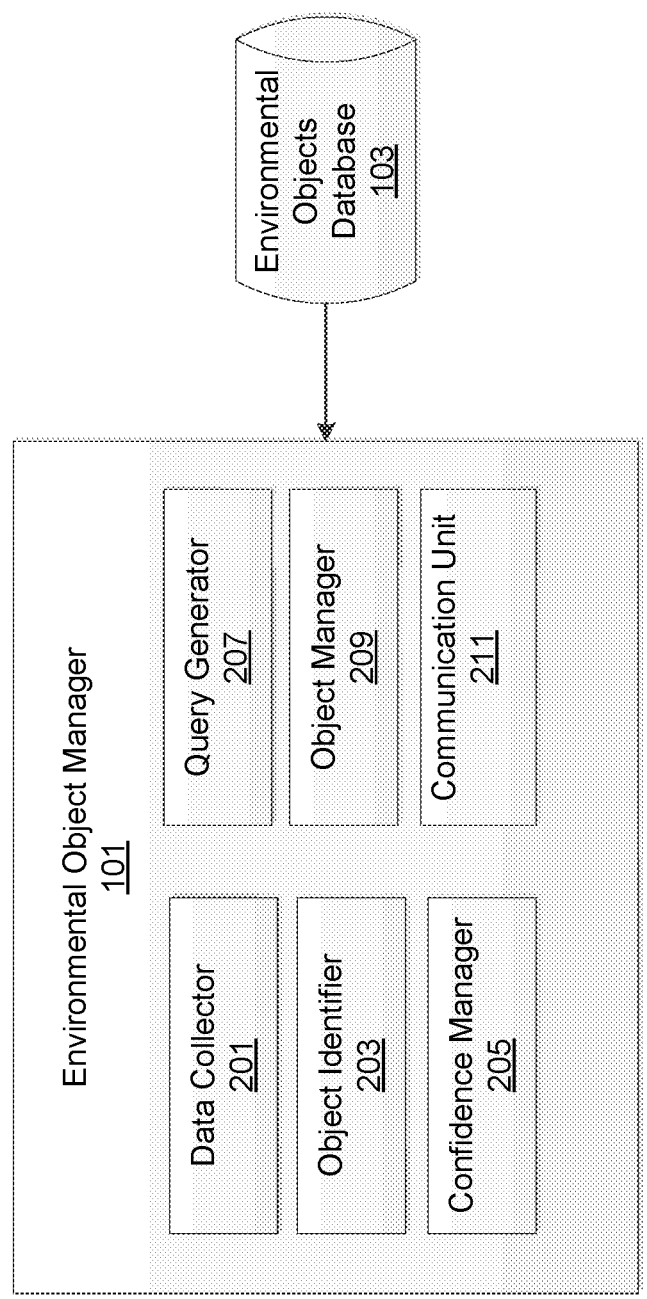
FIG. 2 shows a diagram illustrating a configuration of an environmental object management device of the map information management system according to one exemplary embodiment.

FIG. 2 shows a diagram illustrating a configuration of an environmental object management device of the map information management system according to one exemplary embodiment. The environmental object manager 101 includes modules such as a data collector 201, object identifier 203, confidence manager 205, query generator 207, object manager 209, and communication unit 211. The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM). Each module may work in conjunction with another module to accomplish their various tasks.

The data collector 201 may collect data from sensors of a vehicle 110 for processing. Each vehicle 110 and mobile device 104 may include different sensors, thus, the data collector 201 may use the communication unit 211 to communicate with the mobile device 104 to identify the sensors from the vehicle 110 and/or mobile device 104 which may be used to collect environmental data. The data collector 201 may then retrieve the environmental information from the sensors of the vehicle 110 through communication with either the vehicle 110 communications unit(s) and/or the sensors themselves. In many cases, the retrieved/collected environmental data will be in the form of images or video. Further, the sensors may provide a location for the vehicle 110 or user 106 location (e.g., using GPS), as well as, locations of objects in the environmental information through various means, such as through location triangulation and/or image processing.

Upon collection of environmental data from the sensors, the object identifier 203 identifies objects within the environmental data. The object identifier 203 may rely on semantic querying, pattern/image recognition, and other machine learning methods to determine objects within the environmental data. The object identifier 203 may include location information (e.g., of the vehicle 110 and/or user 106, or a location of the object itself) with the identified object. The object identifier 203 may retrieve known information about objects from the environmental objects database 103. The objects may further be separated into various classes, such as signage (e.g., speed limits, stop signs, yields, etc.), road markings (high occupancy vehicle, bike lanes, lane markings, lane configuration, etc.), buildings (e.g., walls, windows, entry ways, bridges, overpasses, utility poles, mailboxes, fire hydrants, etc.), road boundaries (e.g., walls, on/off ramps, multiple level roadways, guard rails, islands, curbs, speed bumps, on-off ramps, shoulders, etc.), construction (e.g., cones, caution tape, barriers, construction signs, etc.), natural hazards (e.g., trees, rock outcroppings, embankments, drop-offs, etc.), and the like.

The object identifier 203, may provide information such as the identification method, similarities of objects in the same environmental data, reports by users/mobile devices, changes in detected objects, and/or fuzziness in object visualization (e.g., sharpness of the object, obstructions to a clear view of the object, etc.) to the confidence manager 205 to determine a confidence level of the identification/classification for the identified objects in the environmental data. Reports by users/mobile devices may place greater value on more recent reports over past reports. The confidence manager 205 may weight each piece of provided information differently to determine the confidence level. A confidence threshold may be established according to ambiguities in the incoming sensor data, based on historical knowledge of confidence levels or set by a user. The confidence level may also account for the capabilities of the sensors from which the data is received.

The query generator 207 may, based on the confidence level in identified objects near the user, generate one or more questions to present to the user 106. The question(s) may relate to one or more of the identified objects based on the confidence level for each object not meeting the confidence threshold. The query generator 207 may also determine how best to present a question to the user 106, e.g., when both lane markings and road boundaries are unclear based on their confidence levels, the query generator 207 may present the user with an image of the environment in question asking the driver to draw lane markers and point out the road boundaries as well. The image may be directly from the collected environmental data, or a generated representation of all of the known objects (objects meeting the confidence threshold) in the environment with the unknown objects marked with a '?'. Further, the query generator 207 may determine what question will provide the most accurate answer in the least intrusive manner (i.e., shortest question/answer possible).

In another example, the query generator 209 may present the user with a natural language processed question asking about a particular identified object, e.g., the mobile device 104 displays a question asking "were there three lanes?" Thus, the user 106 may only need to select between answers "Yes" and "No". In other examples, the user 106 may be previously be inaccurate with answers and the query generator 207 may then include known wrong answers for the user to select from in order to determine whether to change the confidence level of the identified object based on the user's answer. The query generator 207 may also include known objects (i.e., objects meeting the confidence threshold) as unknown objects (i.e., objects that do not meet the confidence threshold) to establish a confidence level with regard to any answer for the user 106.

Further, the query generator 207 may generate questions from online map data that needs further verification. The system may base the determination of which aspects need further verification on different criteria such as whether another vehicle/user recently reported an abnormal perception, a detection of a recent change to an object, or the like.

The query generator 207, once a query is generated, may determine if the user 106 is in a position to answer such a query. Such a position may be determined by communicating with the vehicle 110 using the communication unit 211 to determine a time when the user 106 is capable of answering. For example, the query generator 209 may request GPS sensor data the vehicle 110 (or mobile device 104) to determine when the vehicle 110 is stopped for a predetermined period of time (e.g., one second or more), or when it is known the user 106 is not using the mobile device 104. Other examples may include the vehicle 110 simply sending an all clear notice once stopped or a user 106 sending a request from the mobile device 104 when they feel they can answer queries. Other examples may also include the query generator 207 sending the query immediately without prior safe notice for the user 106 to answer. In another example, the user 106 may be a passenger of the vehicle 110 and thus will not require any check for safety.

The query generator 207 may also determine priority for classes of identified objects to query the user 106. For example, signage, road markings, and road boundaries may be prioritized as queries to the user over buildings, constructions, and natural hazards, e.g., a speed sign is still present in the environment at a 60% confidence level which is below an 80% confidence threshold would be prioritized over information about buildings and trees which are unclear. However, should the user 106 respond to the initial query and still be stopped, additional queries which are of a lower priority may then be presented to the user 106 until the vehicle 110 is no longer at a stop.

The object manager 209 may then receive the answer to the query from the user 106 and provide the answer to the confidence manager 205 for adjusting the confidence level of the identified object(s) in the query. The object manager 209, will also change, add, or remove identified objects from the environmental objects database 103. The environmental objects database 103 may be a part of the environmental object manager 101 or a part of a separate server or device which provides access to the environmental object manager 101 to the database.

Figure 3:
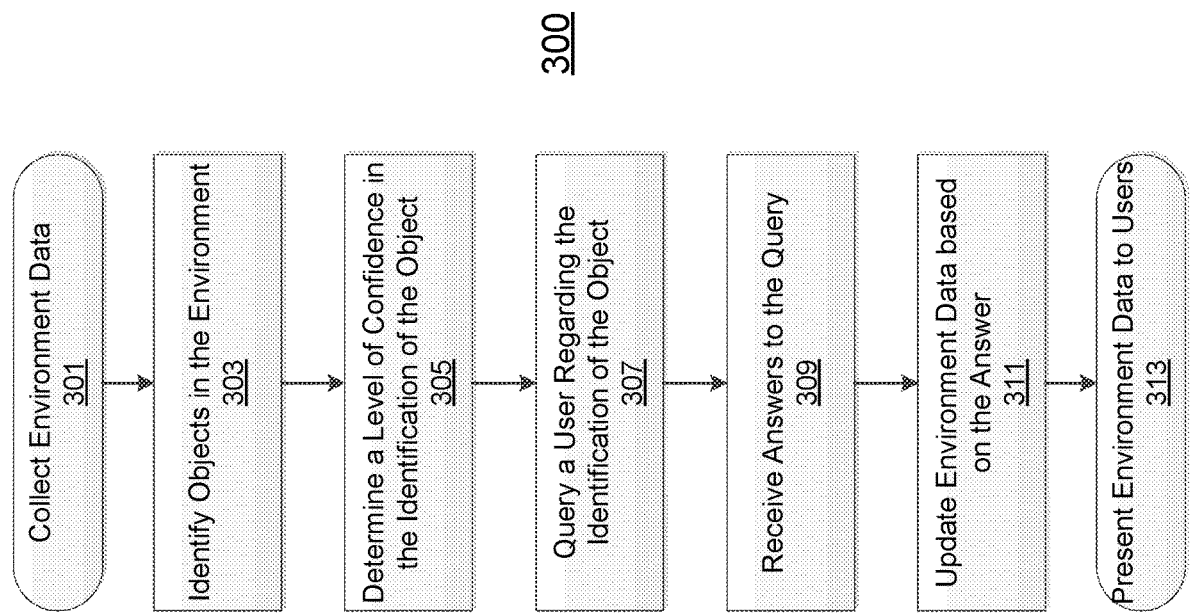
FIG. 3 shows a flowchart illustrating a flow of an environmental object management process for the map information management system according to one exemplary embodiment.

FIG. 3 shows a flowchart illustrating a flow of an environmental object management process for the map information management system according to one exemplary embodiment. In step 301, the environmental object manager 101 collects environmental data that is collected from sensors of the vehicle 110 and/or mobile device 104. The environmental data collected is often a video or image which is then used to identify objects in the environment 303. Each temporal portion of a video and/or each image are scanned/searched to identify objects that may affect navigation or travel along the roadway. The identified objects may be identified through one or more means such as semantic querying, pattern/image recognition, and other machine learning methods to determine objects within the environmental data. Each identified object may be placed within a class of objects for simpler and more logical prioritization of the objects.

In step 305, the environmental object manager 101 may then determine a level of confidence in the identification of the object based on object identification methods and knowledge of the sensor capabilities from which the environmental data was collected. The environmental object manager 101 then apply a confidence value filter, such as a confidence threshold to the identified objects and each of their confidence values to determine which identified objects need further details to be provided or requested from users. The environmental object manager 101 may also prioritize among the identified objects with low confidence values based on the values themselves, and/or classification of the identified objects.

In step 307, a query for each and/or a plurality of the low confidence identified object(s) may be generated and the query may be sent to the user 106 regarding the identification of the object. The query may be generated by a natural language processor or as a request for a drawn image of the environment and/or identified object. The query may also include choices from which the user 106 may select. The choices may clarify characteristics of the identified object. In step 309, once the user 106 answers the query, the environmental object manager 101 may receive the answers to the query. In step 311, based on the answers, the environmental object manager 101 updates the environment data for each of the identified objects addressed by the answers in the environmental objects database 103. The environmental object manager 101 may also update the identified object information based on the user providing the answer (e.g., historical information regarding accuracy). In step 313, the updated information regarding the identified objects is presented to users of the map service 100.

In one exemplary embodiment, the environmental object manager 101 may collect perceptions from the vehicle 110 sensors (e.g., camera or lidar) and will determine confidence values related to the perceptions to decide whether to present the user 106 (e.g., driver or passenger) with a question about the perception. For example, upon perceiving a stop sign is still present in the environment with a confidence level of 60% (e.g., due to an obstruction to the sign and/or conflict with another user's object information that fails to include the stop sign), which is below a perception confidence threshold of 90%, the vehicle generates a question for the driver to verify that the identified stop sign is actually a stop sign (e.g., the environmental object manager 101 knows the sign has an octagonal shape, but is unsure of the color). The user 106 may then be asked what kind of sign the identified object was by including the pertinent portion (e.g., image of the sign) of the collected perception.

Further, perceptions may be associated with spatial location of objects. For example, upon perceiving a stop sign in a particular location, the environmental object manager 101 may be 90% confident the stop sign is located along a traveled route within a 30 foot range of such a perception. The confidence level may be lower than 100% because previous reports of the stop sign occurred closer or further from the current location of the perception and/or the perception unclear due to obstructions in the field of view.

Next, a hardware description of the server 100 according to exemplary embodiments is described with reference to FIG. 4. In FIG. 4, the server 100 includes a CPU 400 which performs the processes described above/below. The process data and instructions may be stored in memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 100 communicates, such as a server or computer.

Further, the claimed advancements may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

In order to achieve the server 100, the hardware elements may be realized by various circuitry elements, known to those skilled in the art. For example, CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The server 100 in FIG. 4 also includes a network controller 406, such as an Intel Ethernet PRO network interface card from Intel Corporation of America, for interfacing with network 102. As can be appreciated, the network 102 can be a public network, such as the Internet, or a private network such as an LAN or WAN network, or any combination thereof and can also include PSTN or ISDN sub-networks. The network 102 can also be wired, such as an Ethernet network, or can be wireless such as a cellular network including EDGE, 3G and 4G wireless cellular systems. The wireless network can also be WiFi, Bluetooth, or any other wireless form of communication that is known.

The server 100 further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the server 100, such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the server 100. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in the circuitry on a single chipset.

Figure 5:
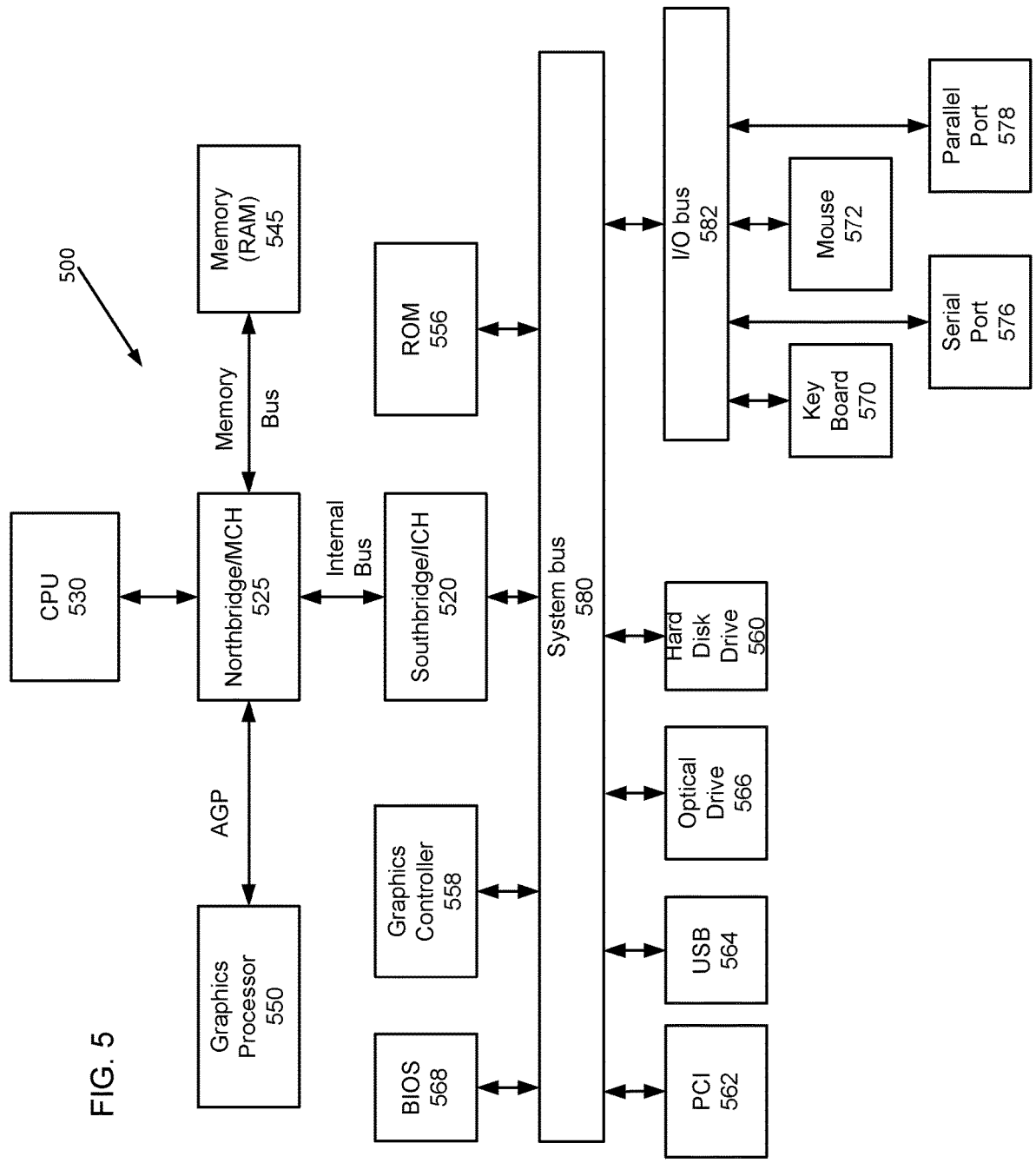
FIG. 5 shows an exemplary block diagram of a data processing system according to one exemplary embodiment.

FIG. 5 shows a schematic diagram of a data processing system, according to certain embodiments, for context aware navigation. The data processing system is an example of a computer in which specific code or instructions implementing the processes of the illustrative embodiments may be located to create a particular machine for implementing the above-noted process.

Figure 6:
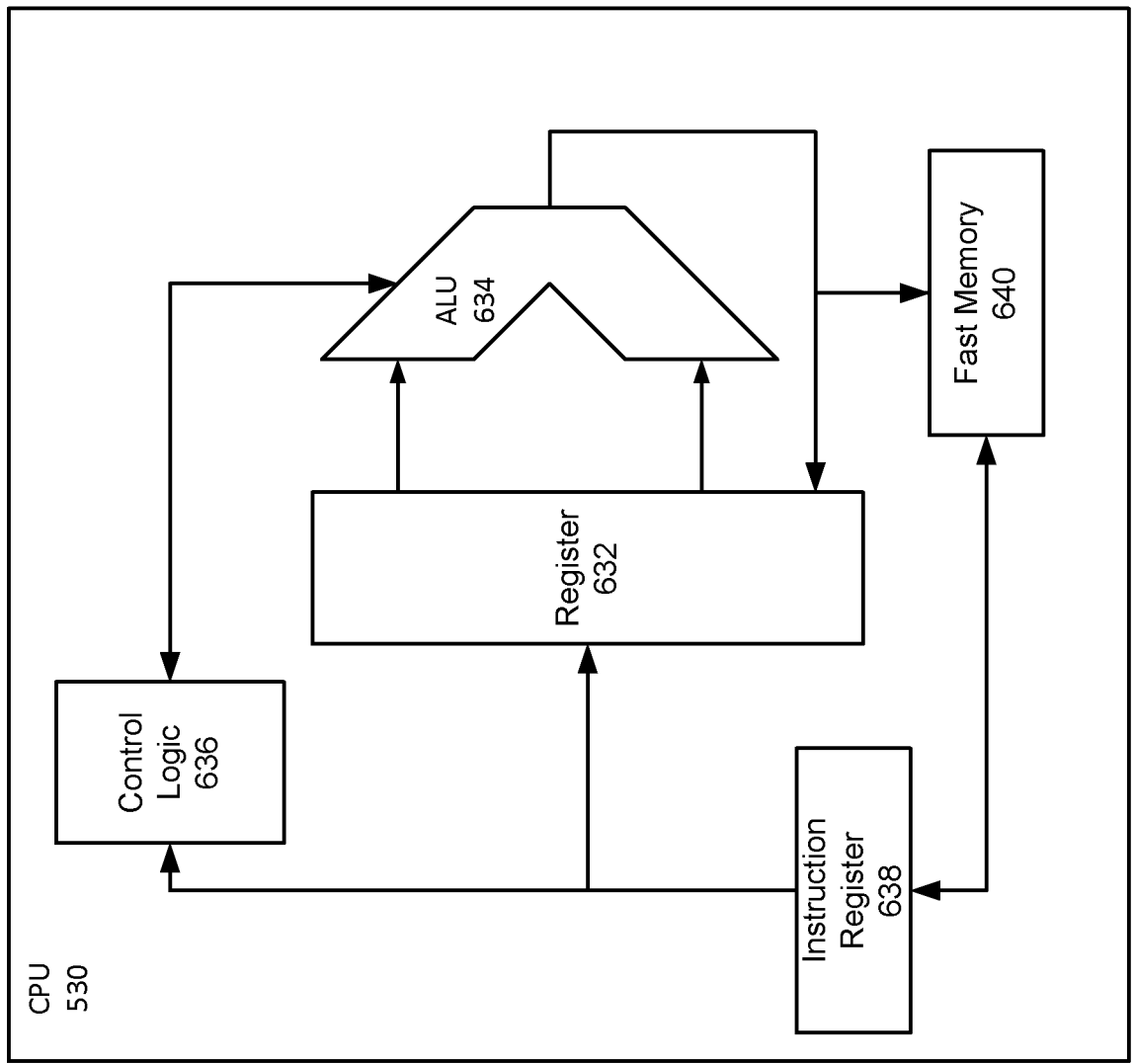
FIG. 6 shows an exemplary block diagram of a central processing unit according to one exemplary embodiment.

In FIG. 5, data processing system 500 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus, and connects to the graphics processor 550 via an accelerated graphics port (AGP). The NB/MCH 525 also connects to the SB/ICH 520 via an internal bus (e.g., a unified media interface or a direct media interface). The CPU Processing unit 530 may contain one or more processors and may even be implemented using one or more heterogeneous processor systems. For example, FIG. 6 shows one implementation of CPU 530.

Further, in the data processing system 500 of FIG. 5, SB/ICH 520 is coupled through a system bus 580 to an I/O Bus 582, a read only memory (ROM) 556, an universal serial bus (USB) port 564, a flash binary input/output system (BIOS) 568, and a graphics controller 558. In one implementation, the I/O bus can include a super I/O (SIO) device.

PCI/PCIe devices can also be coupled to SB/ICH 520 through a PCI bus 562. The PCI devices may include, for example, Ethernet adapters, add-in cards, and PC cards for notebook computers. Further, the hard disk drive (HDD) 560 and optical drive 566 can also be coupled to the SB/ICH 520 through the system bus 580. The Hard disk drive 560 and the optical drive or CD-ROM 566 can use, for example, an integrated drive electronics (IDE) or serial advanced technology attachment (SATA) interface.

In one implementation, a keyboard 570, a mouse 572, a serial port 576, and a parallel port 578 can be connected to the system bus 580 through the I/O bus 582. Other peripherals and devices that can be connected to the SB/ICH 520 include a mass storage controller such as SATA or PATA (Parallel Advanced Technology Attachment), an Ethernet port, an ISA bus, a LPC bridge, SMBus, a DMA controller, and an Audio Codec (not shown).

In one implementation of CPU 530, the instruction register 638 retrieves instructions from the fast memory 640. At least part of these instructions are fetched from the instruction register 638 by the control logic 636 and interpreted according to the instruction set architecture of the CPU 530. Part of the instructions can also be directed to the register 632. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640. According to certain implementations, the instruction set architecture of the CPU 530 can use a reduced instruction set architecture, a complex instruction set architecture, a vector processor architecture, a very large instruction word architecture. Furthermore, the CPU 530 can be based on the Von Neuman model or the Harvard model. The CPU 530 can be a digital signal processor, an FPGA, an ASIC, a PLA, a PLD, or a CPLD. Further, the CPU 530 can be an x86 processor by Intel or by AMID; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 4, 5, or 6, constitutes or includes specialized corresponding structure that is programmed or configured to perform the algorithms described in FIGS. 2 and 3. For example, the algorithms described in FIGS. 2 and 3 may be completely performed by the circuitry included in the single device shown in FIG. 4 or the data processing system as shown in FIG. 5.

A system that includes the features in the foregoing description provides numerous advantages to users. In particular, the methodology described herein has the advantage to update roadway map information safely with active crowd sourcing. In addition, the system facilitates and improves the quality and accuracy of roadway map information.

The features described herein provide a way to update map information for objects in the map information when the object's identity is unsure. The system presents users with generated questions which clarify the object identity and are presented safely for the user to answer. This map information is then provided to map service based on a confidence value in the identified object. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A map object management device comprising:
    a database that stores environment data in which objects are tagged with identifying information and location information for populating a map, the objects are at least one of a physical characteristic of an environment in which a user is travelling and an abstract characteristic associated with rules of travel in the environment;
    data collecting equipment that collects the environment data; and
    processing circuitry configured to
    identify, from the data collecting equipment, an object in the environment,
    determine a confidence level that the object is correctly identified,
    present a query to the user associated with the identification of the object based on the level of confidence, the query including an image to be modified by the user,
    receive an answer to the query from the user, and
    update the environment data in the database based on the answer to the query.

2. The map object management device according to claim 1, wherein the physical characteristic of the environment includes at least one of roadway markings, signage, boundaries, buildings, and construction.

3. The map object management device according to claim 1, wherein the query is presented based on the confidence level failing to meet a confidence threshold.

4. The map object management device according to claim 1, wherein the processor is further configured to
determine the user is safe for the presentation of the query.

5. The map object management device according to claim 4, wherein the user is safe when the user is at a stop for more than a predetermined time threshold.

6. The map object management device according to claim 1, wherein the confidence level is based on at least one of perceptibility of the object, reports by users, and changes in detected objects.

7. The map object management device according to claim 1, wherein the query is a diagram for the user to fill out.

8. A map object management method comprising:
collecting environment data associated with an environment around a user in which objects are tagged with identifying information and location information for populating a map, the objects are at least one of a physical characteristic of an environment in which a user is travelling and an abstract characteristic associated with rules of travel in the environment;
identifying, by a processor, an object in the environment,
determining, by the processor, a confidence level that the object is correctly identified,
presenting, by the processor, a query to the user associated with the identification of the object based on the level of confidence, the query including an image to be modified by the user,
receiving an answer to the query from the user, and
updating, by the processor, the environment data in the database based on the answer to the query.

9. The map object management method according to claim 8, wherein the physical characteristic of the environment includes at least one of roadway markings, signage, boundaries, buildings, and construction.

10. The map object management method according to claim 8, wherein the query is presented based on the confidence level failing to meet a confidence threshold.

11. The map object management method according to claim 8, further comprising:
determining, by the processor, the user is safe for the presentation of the query.

12. The map object management method according to claim 11, wherein the user is safe when the user is at a stop for more than a predetermined time threshold.

13. The map object management method according to claim 8, wherein the confidence level is based on at least one of perceptibility of the object, reports by users, and changes in detected objects.

14. The map object management method according to claim 8, wherein the query is a diagram for the user to fill out.

15. A non-transitory storage computer readable medium including programming instructions for:
collecting environment data associated with an environment around a user in which objects are tagged with identifying information and location information for populating a map, the objects are at least one of a physical characteristic of an environment in which a user is travelling and an abstract characteristic associated with rules of travel in the environment;
identifying, with processing circuitry, an object in the environment,
determining, with the processing circuitry, a confidence level that the object is correctly identified,
presenting, with the processing circuitry, a query to the user associated with the identification of the object based on the level of confidence, the query including an image to be modified by the user,
receiving an answer to the query from the user, and
updating, with the processing circuitry, the environment data in the database based on the answer to the query.

16. The non-transitory computer readable medium according to claim 15, wherein the physical characteristic of the environment includes at least one of roadway markings, signage, boundaries, buildings, and construction.

17. The non-transitory computer readable medium according to claim 15, wherein the query is presented based on the confidence level failing to meet a confidence threshold.

18. The non-transitory computer readable medium according to claim 15, further comprising instructions for:
determining, with the processing circuitry, the user is safe for the presentation of the query.

19. The non-transitory computer readable medium according to claim 18, wherein the user is safe when the user is at a stop for more than a predetermined time threshold.

20. The non-transitory computer readable medium according to claim 15, wherein the confidence level is based on at least one of perceptibility of the object, reports by users, and changes in detected objects.

* * * * *